United States Patent
Ringland et al.

(10) Patent No.: US 11,418,959 B2
(45) Date of Patent: Aug. 16, 2022

(54) AUTOMATIC PAIRING OF DEVICES TO WIRELESS NETWORKS

(71) Applicant: British Telecommunications Public Limited Company, London (GB)

(72) Inventors: Simon Ringland, London (GB); Francis Scahill, London (GB)

(73) Assignee: British Telecommunications Public Limited Company, London (GB)

( * ) Notice: Subject to any disclaimer, the term of this patent is extended or adjusted under 35 U.S.C. 154(b) by 495 days.

(21) Appl. No.: 16/475,293

(22) PCT Filed: Dec. 20, 2017

(86) PCT No.: PCT/EP2017/083914
§ 371 (c)(1),
(2) Date: Jul. 1, 2019

(87) PCT Pub. No.: WO2018/122076
PCT Pub. Date: Jul. 5, 2018

(65) Prior Publication Data
US 2019/0335324 A1     Oct. 31, 2019

(30) Foreign Application Priority Data
Dec. 30, 2016   (EP) .................................... 16207617

(51) Int. Cl.
*H04L 9/00*     (2022.01)
*H04W 12/50*    (2021.01)
(Continued)

(52) U.S. Cl.
CPC ......... *H04W 12/50* (2021.01); *H04L 41/0803* (2013.01); *H04L 61/5007* (2022.05);
(Continued)

(58) Field of Classification Search
CPC ... H04W 12/50; H04W 76/12; H04W 12/088; H04W 12/06; H04W 84/12; H04L 41/0803; H04L 61/2007
(Continued)

(56) References Cited

U.S. PATENT DOCUMENTS 7,277,424 B1   10/2007  Dowling
8,555,344 B1   10/2013  Wiedmann et al.
(Continued)

FOREIGN PATENT DOCUMENTS

CN   102595643 A   7/2012
CN   102843682 A   12/2012
(Continued)

OTHER PUBLICATIONS

European Search Report for Application No. EP 16207617, dated May 16, 2017 (7 pgs).
(Continued)

*Primary Examiner* — Josnel Jeudy
(74) *Attorney, Agent, or Firm* — Patterson Thuente IP

(57) ABSTRACT

A method for the automatic pairing of a device wirelessly with a first secure WLAN provided by a pairing access point using first set of security credentials, involving: establishing automatically a connection between the device and a second WLAN provided by an available access point, and authenticating the device with the second WLAN using a second set of security credentials stored on the device; identifying the pairing access point using the second set of security credentials; creating a tunnel between the device and the pairing access point over the second WLAN; making a request from the device, via the tunnel, to a provisioning server on the pairing access point for transfer of the second set of security credentials, being the security credentials needed to pair with the first secure WLAN, from the pairing
(Continued)

access point to the device; and using the second set of security credentials to configure the security settings for the first secure WLAN in the device.

6 Claims, 9 Drawing Sheets

(51) Int. Cl.
*H04W 76/12* (2018.01)
*H04L 41/0803* (2022.01)
*H04W 12/06* (2021.01)
*H04W 12/088* (2021.01)
*H04L 61/5007* (2022.01)
*H04W 84/12* (2009.01)

(52) U.S. Cl.
CPC ......... *H04W 12/06* (2013.01); *H04W 12/088* (2021.01); *H04W 76/12* (2018.02); *H04W 84/12* (2013.01)

(58) Field of Classification Search
USPC .......................................................... 726/6
See application file for complete search history.

(56) References Cited

U.S. PATENT DOCUMENTS

| | | | |
|---|---|---|---|
| 9,078,137 | B1 | 7/2015 | Chechani et al. |
| 2002/0032855 | A1 | 3/2002 | Neves et al. |
| 2003/0004937 | A1 | 1/2003 | Salmenkaita et al. |
| 2003/0078965 | A1 | 4/2003 | Cocotis et al. |
| 2003/0079030 | A1 | 4/2003 | Cocotis et al. |
| 2007/0206527 | A1 | 9/2007 | Lo et al. |
| 2007/0287450 | A1 | 12/2007 | Yang et al. |
| 2009/0019134 | A1 | 1/2009 | Bellifemine et al. |
| 2011/0280180 | A1 | 11/2011 | McCann et al. |
| 2011/0314145 | A1 | 12/2011 | Raleigh et al. |
| 2013/0013757 | A1 | 1/2013 | Millington et al. |
| 2013/0198817 | A1 | 8/2013 | Haddad et al. |
| 2013/0276060 | A1* | 10/2013 | Wiedmann .......... H04L 63/0876 726/3 |
| 2013/0333016 | A1 | 12/2013 | Coughlin et al. |
| 2013/0347073 | A1 | 12/2013 | Bryksa et al. |
| 2014/0259124 | A1 | 9/2014 | Petersen et al. |
| 2014/0328190 | A1 | 11/2014 | Lord et al. |
| 2014/0355579 | A1 | 12/2014 | Viswanathan et al. |
| 2015/0043377 | A1 | 2/2015 | Cholas et al. |
| 2015/0067819 | A1 | 3/2015 | Shribman et al. |
| 2015/0072653 | A1 | 3/2015 | Fan et al. |
| 2015/0200882 | A1 | 7/2015 | Raleigh |
| 2015/0244586 | A1 | 8/2015 | Lee et al. |
| 2015/0245278 | A1 | 8/2015 | Scahill |
| 2015/0257008 | A1 | 9/2015 | Benson et al. |
| 2015/0257066 | A1 | 9/2015 | Salkintzis |
| 2015/0382196 | A1 | 12/2015 | Hillier et al. |
| 2016/0050710 | A1 | 2/2016 | Hagan |
| 2016/0080889 | A1* | 3/2016 | Viswanathan ........ H04W 12/50 455/419 |
| 2016/0205553 | A1 | 7/2016 | Lee |
| 2016/0241541 | A1 | 8/2016 | Soelberg et al. |
| 2017/0026899 | A1 | 1/2017 | Albert et al. |
| 2017/0141954 | A1 | 5/2017 | Stevens et al. |
| 2017/0359344 | A1 | 12/2017 | Kaal et al. |
| 2018/0077022 | A1* | 3/2018 | Van Oost ............. H04W 12/08 |
| 2018/0262465 | A1* | 9/2018 | Maattanen .......... H04W 12/068 |
| 2018/0359764 | A1 | 12/2018 | Ong et al. |
| 2018/0367619 | A1 | 12/2018 | Jung et al. |
| 2019/0116493 | A1 | 4/2019 | Cyril et al. |
| 2019/0223053 | A1* | 7/2019 | Ashwood-Smith ......... H04W 84/042 |
| 2019/0334794 | A1 | 10/2019 | Halepovic et al. |
| 2019/0335323 | A1 | 10/2019 | Ringland et al. |
| 2019/0335516 | A1 | 10/2019 | Ringland et al. |

FOREIGN PATENT DOCUMENTS

| | | |
|---|---|---|
| CN | 104168561 A | 11/2014 |
| CN | 104219734 A | 12/2014 |
| CN | 104469979 A | 3/2015 |
| CN | 105282158 A | 1/2016 |
| CN | 105376738 A | 3/2016 |
| CN | 105792208 A | 7/2016 |
| CN | 110692280 A | 1/2020 |
| EP | 2493147 A1 | 8/2012 |
| EP | 2608590 A1 | 6/2013 |
| EP | 2986038 A1 | 2/2016 |
| GB | 2494920 A | 3/2013 |
| JP | 2015162826 A | 9/2015 |
| WO | WO 2007/127162 A2 | 11/2007 |
| WO | WO 2018/122073 A1 | 7/2018 |
| WO | WO 2018/122074 A1 | 7/2018 |
| WO | WO 2018/122076 A1 | 7/2018 |

OTHER PUBLICATIONS

Great Britain Search Report Under Section 17 for Application No. GB16224305, dated Jun. 1, 2017 (4 pgs).
International Search Report for Application No. PCT/EP2017/083914, dated Feb. 2, 2018 (4 pgs).
Office Action For Chinese Application No. 201780085051.0, dated Mar. 24, 2021, 23 pages.
European Search Report for Application No. 16207620.2, dated May 16, 2017, 7 pages.
Extended European Search Report for Application No. 16207552.7, dated May 19, 2017, 8 pages.
International Preliminary Report on Patentability for Application No. PCT/EP2017/083888, dated Jul. 11, 2019, 8 pages.
International Preliminary Report on Patentability for Application No. PCT/EP2017/083889, dated Jul. 11, 2019, 7 pages.
International Preliminary Report on Patentability for Application No. PCT/EP2017/083914, dated Jul. 11, 2019, 8 pages.
International Search Report and Written Opinion for Application No. PCT/EP2017/083888, dated Mar. 8, 2018, 9 pages.
International Search Report and Written Opinion for Application No. PCT/EP2017/083889, dated Apr. 11, 2018, 10 pages.
International Search Report for Application No. PCT/EP2017/063889, dated Apr. 11, 2018, 5 pages.
Search Report under Section 17 for Application No. 1622419.8, dated May 23, 2017, 3 pages.
Search Report under Section 17 for Application No. 1622433.9, dated May 31, 2017, 3 pages.
U.S. Appl. No. 16/475,270, filed Dec. 20, 2017, Inventor(s): Ringland et al.
U.S. Appl. No. 16/475,280, filed Dec. 20, 2017, Inventor(s): Ringland et al.
Office Action for Chinese Application No. 201780084912.3, dated Sep. 15, 2021, 9 pages.
Office Action for Chinese Application No. 201780084919.5, dated Sep. 3, 2021, 8 pages.
Office Action for Chinese Application No. 201780085051.0, dated Aug. 16, 2021, 6 pages.

* cited by examiner

AUTOMATIC PAIRING OF DEVICES TO WIRELESS NETWORKS

CROSS-REFERENCE TO RELATED APPLICATION

The present application is a National Phase entry of PCT Application No. PCT/EP2017/083914, filed Dec. 20, 2017, which claims priority from European Patent Application No. 16207617.8 filed Dec. 30, 2016, each of which is fully incorporated herein by reference.

TECHNICAL FIELD

The present disclosure relates to a method for the automatic pairing of a device wirelessly with a wireless LAN provided by an access point, and a device capable of automatic wireless connection with a wireless LAN provided by an access point.

BACKGROUND

In this specification, "pairing" means the provisioning of security credentials and all required configuration to enable connection between a device and a specific identified secure WLAN.

Since Apple Corporation first offered Wi-Fi, according to 802.11b, as an option on its iBook computers in 1999, Wi-Fi, operating under at least one of the IEEE 802.11 family of standards such as 802.11b, 802.11g, 802.11n-2.4, operating in the 2.400-2.500 GHz band, or 802.11a, 802.11ac and 802.11n operating in the 4.915-5.825 GHz band, and wireless LANs generally have become ubiquitous, deployed not just in commercial, retail and educational establishments, but also very significantly in domestic situations. It has been said that Wi-Fi's main use is in home networking, particularly since it became commonplace for domestic customers to have high speed broadband access. Wireless LANs in the home support desk-top, laptop and tablet computers, smart-phones, Internet-connected televisions, set-top boxes, PVRs and other media devices—such as media servers and music-streamers, as they provide the easiest and most flexible way to connect such devices to the Internet.

The advent of the Internet of Things, IoT, in which almost anything might be connected to the Internet—from cars and other vehicles to dustbins, fridges, washing machines, dishwashers, ovens and coffee-makers, provides even greater incentive for wireless LANs to be deployed domestically in ever greater numbers.

Of course, much of the attraction of wireless LANs is that with a good enough signal the WLAN can be accessed everywhere in the home, and even into the garden and beyond, all without the need to hook up a cable to get connected. But this same quality also means that, unless security measures are applied, passers-by and criminals can eavesdrop on WLAN traffic or freeload on the Internet connection. It is usual therefore for domestic wireless LANs to be secured to at least the minimum level of requiring a password before access is granted.

Generally, nowadays, once a password has been entered into a device to obtain access to a wireless LAN, the device "remembers" the password so that subsequent attempts to access the wireless LAN do not require the password to be entered afresh. This is helpful, but it does mean that it is easy to forget one's Wi-Fi password—as one needs to provide it so rarely.

This of course then poses a problem when it comes to "installing" new devices that need Wi-Fi access—one needs to remember or retrieve the password for the wireless LAN for each new device. And of course, as with all passwords, users are encouraged to make Wi-Fi passwords long and complicated, with a mix of lower-case and upper-case letters, numbers and "special characters" (*&$£@?! etc.) which not only makes remembering precisely what the password is ("was it Wrexit16! or Wrecksit16£?) but it also makes it more likely that it will be mis-keyed at least once, and then there is the uncertainty of whether it was mis-keyed or whether one is entering the wrong password.

These problems stimulated the development by the Wi-Fi Alliance of Wi-Fi Protected Setup (WPS) which lets one join a secure Wi-Fi network without needing to select the network name (SSID) and without entering the password—one simply needs to press one button on the WPS-enabled access point/router/gateway and press another button, real or virtual, on the new device to be joined, the two button presses being within two minutes of each other. This is a great boon, but it is not a complete solution—as sometimes one or other of the buttons is out of reach, often because the access point/router/gateway is behind a locked door or because the person desiring to join a new device to the LAN does not have the mobility needed to reach the relevant button. Even when both buttons are reachable, the two-minute window within which both buttons must be pressed can prove an insurmountable hurdle—especially when the new device to be paired and the access point/router/gateway cannot be brought together, such as when the new device is too large to be portable, or has to be installed before use, and resides in a different room, or on a different floor from the access point/router/gateway. For example, it is common for the access point/router/gateway to be installed in a living room or an office, yet nowadays domestic appliances ("white-goods") such as refrigerators, washing machines, cookers, that are all installed in other rooms, are Wi-Fi enabled and need to be connected to a wireless LAN. It may not be possible for a user to move from the access point/router/gateway to the appliance within two minutes, especially if the user if elderly or infirm. Now that the range of wireless LANs is generally sufficient to extend to the garden or garage, the linking of garden and plant care systems, such as automatic watering systems or greenhouse monitoring equipment, to a domestic wireless LAN is becoming commonplace, yet it is unlikely to be possible for one person to use WPS button pushes in such situations.

Domestic appliance manufacturer Siemens offers Wi-Fi enabled domestic appliances such as refrigerators (with internal cameras so that householders can check the content of their fridges, using a smartphone, while out shopping, for example), cookers, and washing machines. These appliances are WPS enabled. But, in the event that WPS cannot be used effectively, a manual connection option can be used instead. In this option, after pressing various buttons on the appliance to turn on a wireless access point in the appliance to create a "Homeconnect" Wi-Fi network, the user connects her smartphone to the "Homeconnect" network, opens an app on the smartphone, selects the name of the domestic wireless LAN and then keys in the password for that domestic network. This transfers the network name and password to the appliance. With a few more pushes of buttons on the appliance, the appliance is connected to the domestic wireless LAN—but of course this approach again requires the user to remember, and successfully key in the network password.

SUMMARY

There therefore exists a need for an alternative way to achieve pairing between a new device and a wireless LAN, such as a domestic Wi-Fi network, preferably one that would be suitable for use when the new device cannot be brought close to the access point/router/gateway—for example because it needs to be installed in another room, or is too bulky to be moved with ease, and/or which might be used by those with restricted mobility, such as the elderly or infirm.

Additionally, as Apple Corporation has shown with its products, there is great appeal in devices that work straight out of the box: "zero touch pairing", as proposed here, would likewise be very attractive to all users.

Accordingly, in a first aspect an embodiment of the present disclosure provides a method for the automatic pairing of a device wirelessly with a first secure WLAN provided by a pairing access point using first set of security credentials, the method comprising establishing automatically a connection between the device and a second WLAN provided by an available access point, and authenticating the device with the second WLAN using a second set of security credentials stored on the device; identifying the pairing access point using the second set of security credentials; creating a tunnel between the device and the pairing access point over the second WLAN; making a request from the device, via the tunnel, to a provisioning server on the pairing access point for transfer of the second set of security credentials, being the security credentials needed to pair with the first secure WLAN, from the pairing access point to the device; and using the second set of security credentials to configure the security settings for the first secure WLAN in the device.

Optionally, creating the tunnel between the device and the pairing access point involves determining an IP address of the pairing access point based on the second set of security credentials.

Optionally, the request is addressed to a network-based provisioning server and the method further comprises, after creating the tunnel, modifying routing instructions in a network routing function so that the request is forwarded down the tunnel to the pairing access point.

Optionally, the method further comprises using the configured settings to pair the device with the first secure WLAN provided by the pairing access point.

Optionally, the method further comprises attempting connection with the first secure WLAN using the configured settings to pair the device with the first secure WLAN provided by the pairing access point, and in the event that the attempt at connection fails, removing the configured credentials from the device.

Optionally, the pairing access point and available access point are connected to a core network, and creating the tunnel comprises: creating a tunnel between the core network and the pairing access point; and establishing routing functions to enable traffic to pass between the device on the available access point and the provisioning server on the pairing access point using the tunnel.

In this way, a user who buys a suitable device can pair that device automatically with his or her secure home WLAN provided by their own "pairing" access point by means of a connection through another wireless LAN, such as a public WLAN, that is also provided by their own pairing access point.

BRIEF DESCRIPTION OF THE DRAWINGS

Embodiments of the disclosure will now be described, by way of example only, with reference to the accompanying drawings, in which.

DETAILED DESCRIPTION

Figure 1:
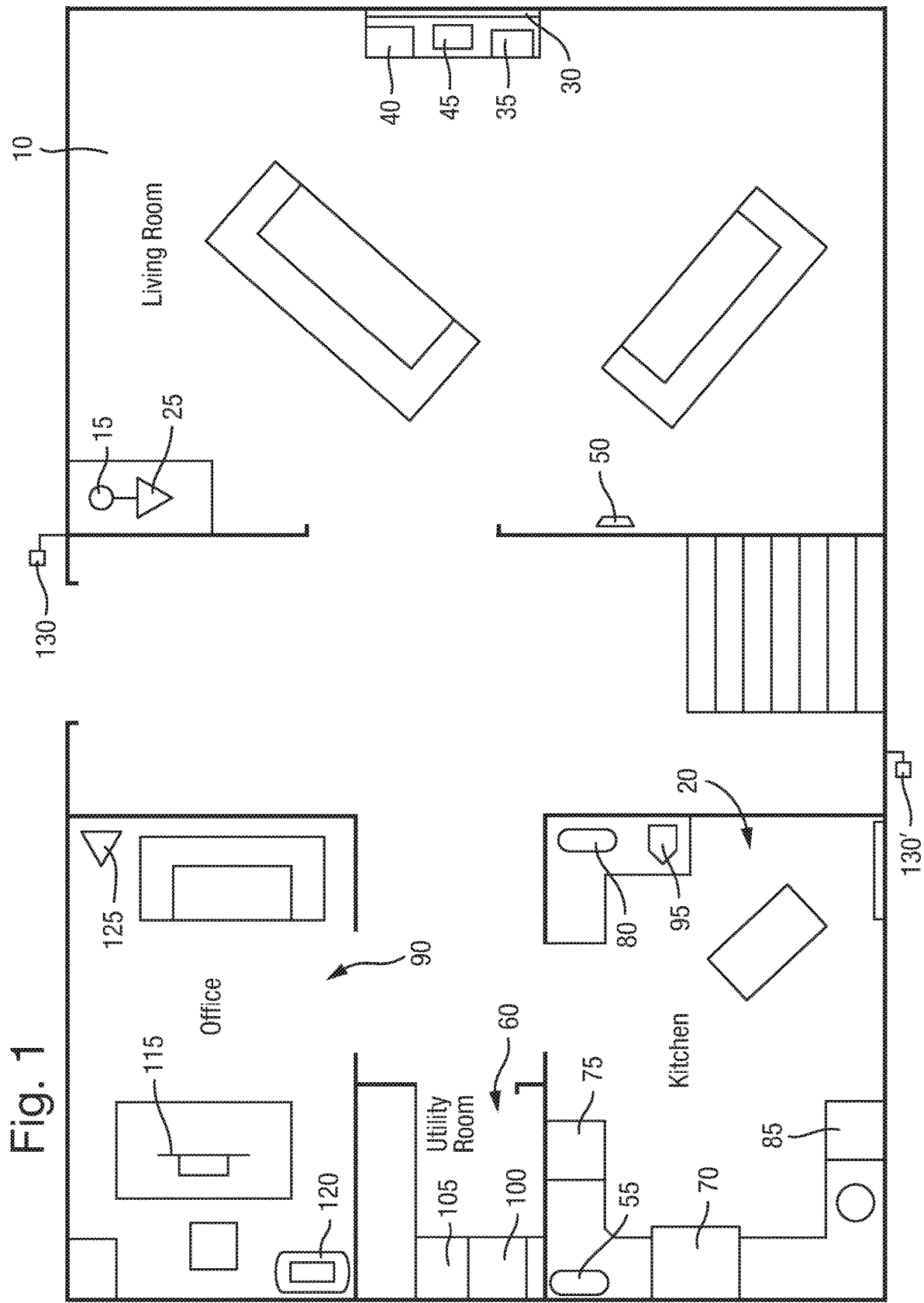
FIG. 1 is a partial plan view of a house showing an arrangement of devices that are connected to a private domestic wireless LAN.

FIG. 1 is a partial plan view of a house showing an arrangement of devices that are connected to a private domestic wireless LAN. In "living room" 10, broadband network access is provided by DSL router 15, a wired, Ethernet, connection is provided from the router 15 to an access point 25 for a secure wireless LAN that serves the entire house. In the same room are a wall-mounted "smart" television 30 that connects, via the wireless LAN, to the DSL router and hence to the Internet. A set-top box 35, a PVR 40, and a computer gaming console 45, each have wired HDMI connections to the television as well as being connected wirelessly to the wireless LAN. Also provided in this room is room thermostat 80 that connects, via the wireless LAN, to the central heating boiler 90 that is wall-mounted in the kitchen 200.

In the kitchen, smart appliances (IoT devices) are connected, via the wireless LAN, to the Internet. These include a refrigerator 70, oven 75, microwave oven 80, and dishwasher 85. A coffee machine 95, is also connected to the wireless LAN and hence to the Internet.

In the laundry/utility room 60, the washing machine 100 and tumble drier 105 are again smart appliances that connect to the Internet via the wireless LAN.

In the office 90, a desktop computer 115, printer 120 and media-server 125 connect to the wireless LAN and hence to the Internet.

On the upper floors, not shown, each bedroom has a wall-mounted smart TV, plus PVR, that connect to the wireless LAN to receive video content streamed over the Internet, as well as remote-controlled loudspeakers to receive music distributed by the media server.

Video security cameras 130, 130' monitor the front and rear entrances to the house, and connect via the wireless LAN to the Internet. Also not shown are the automated, internet-enabled watering systems in the house's garden and greenhouse.

In addition to these fixed devices, the householders have personal smartphones, tablet computers and health trackers that connect to the wireless LAN when they come into range of it. All of these devices, and their replacements need, at some stage to be provided with the login credentials, e.g. SSID and password, needed to access the secure wireless LAN.

Figure 2:
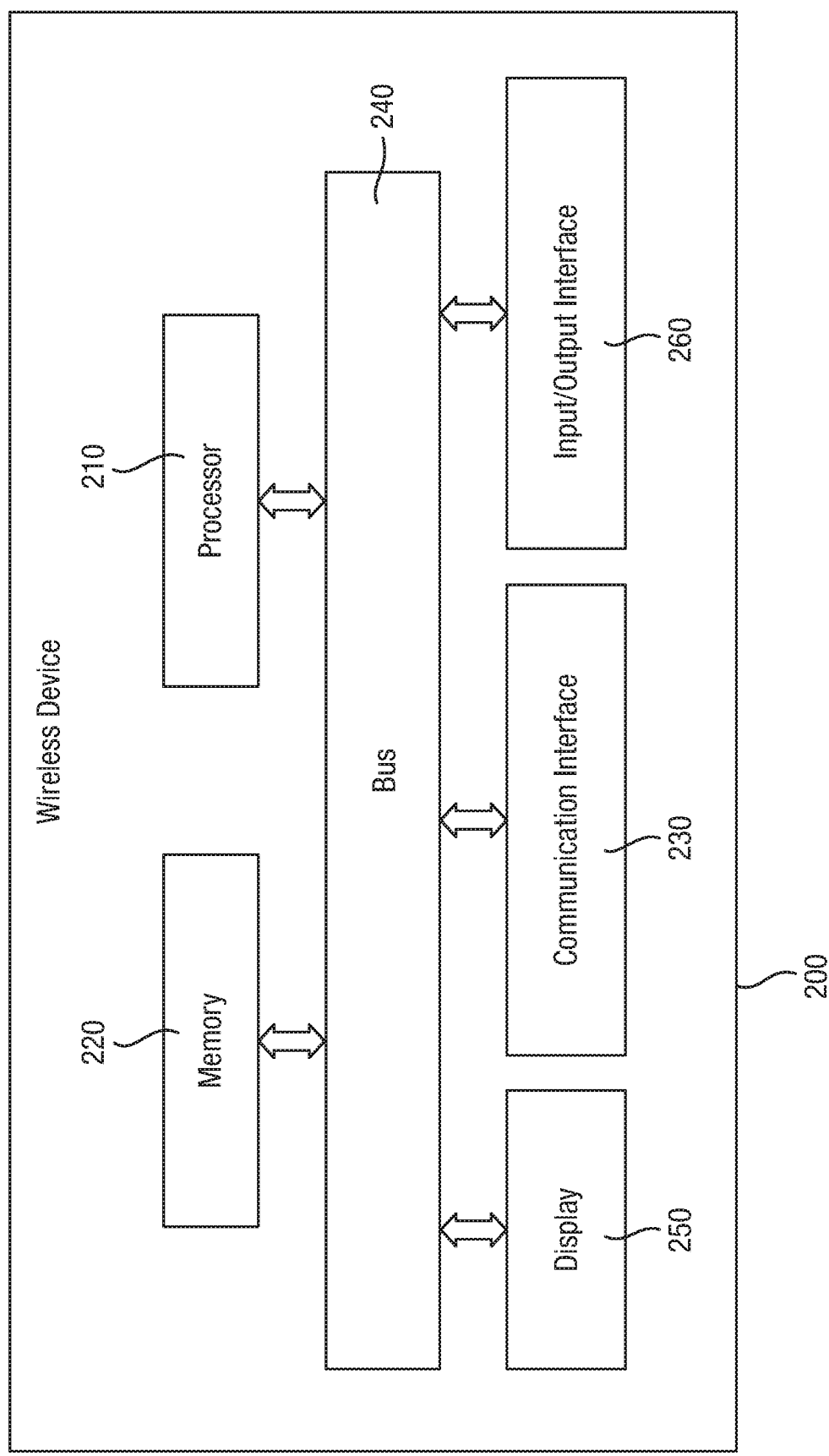
FIG. 2 is a schematic diagram of a device for use with a wireless LAN.

Although all of the devices shown in FIG. 1 have different functions, capabilities and uses, they share several common features relevant to their use with the wireless LAN. FIG. 2 represents a generic wireless LAN enabled device, e.g. a Wi-Fi enabled device 200. The device includes a processor 210 coupled to a memory 220 and a communication interface 230 by a bus 240. In addition, the generic device may include a visual display 250 to output messages, conditions and queries, to a user, as well as an input/output interface 260. If present, the input interface and the display may be combined as a touch screen that both enables and accepts inputs, as well as providing visual outputs. Some simple devices, for example, health trackers, may have neither input/output interface nor a display. The communication interface includes a wireless interface, including RF circuitry, suitable for transmitting to and receiving from a wireless LAN. This may take the form of a transceiver. The wireless interface and RF circuitry may be capable of communicating over multiple frequency bands and using various modulation techniques, according to the nature of the wireless LAN(s) with which the device will be used.

Whenever a new device is to be introduced to the house and paired with the secure wireless LAN, it is necessary to provide the new device with the network identity, e.g. the SSID, and the password, or key, in order that the device can pair with and access the secure network. As explained above, for many people—notably the elderly, infirm, or the less able, and in many circumstances even for the fully able-bodied, it is often difficult and time-consuming to provide the relevant credentials to a new device.

Embodiments of the disclosure provide methods that permit automatic transfer of the relevant credentials to a new device with little or no involvement of a user beyond powering up the new device. In essence, embodiments of the disclosure use a first secure wireless LAN, with which the new device can pair using security credentials stored on the new device, to provides a secure channel over which the security credentials needed to join the secure home network can be passed, the newly supplied security credentials then being used to pair the device with the secure home network.

Figure 3:
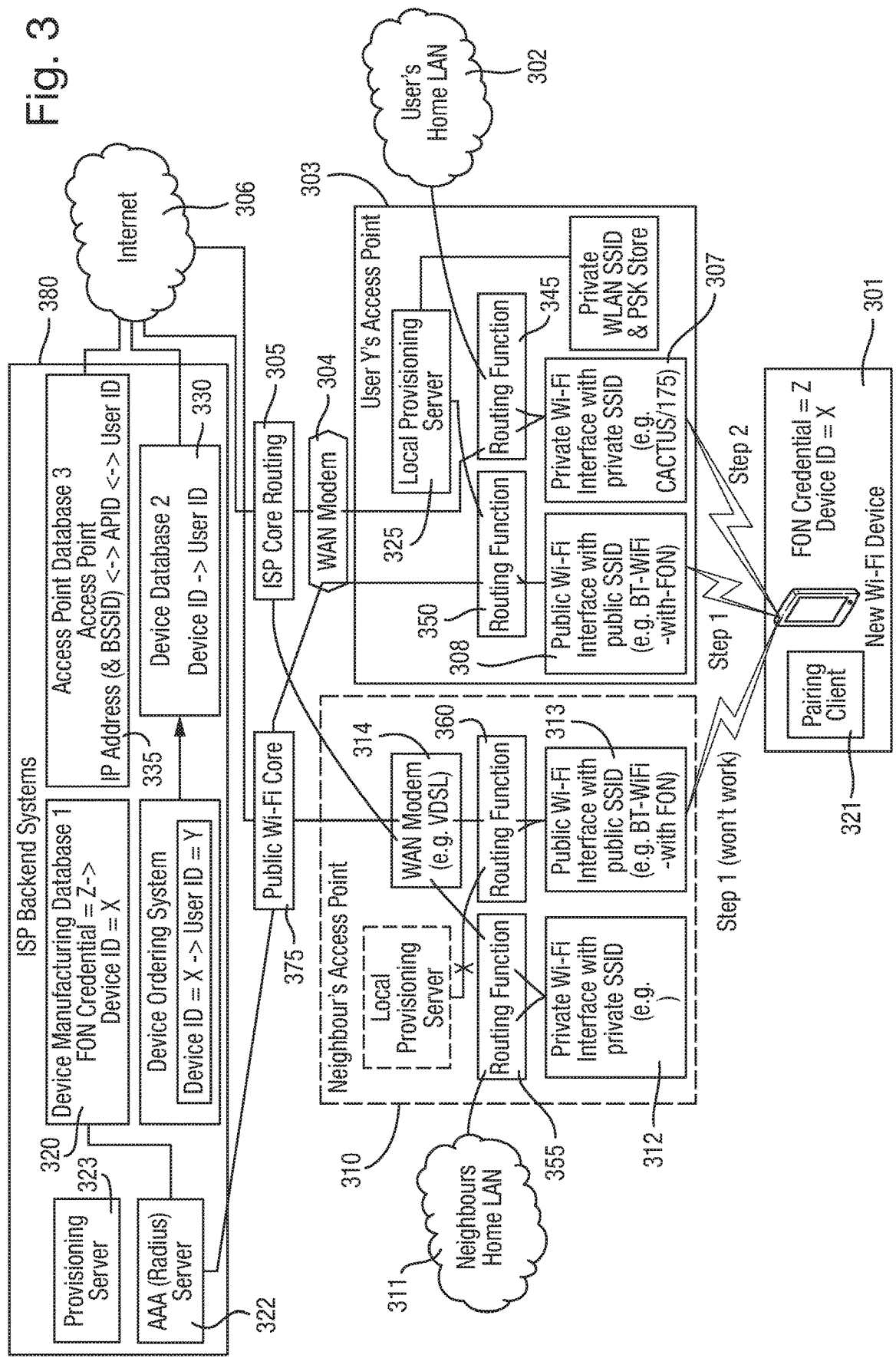
FIG. 3 is a schematic diagram showing the entities involved in an automatic pairing method according to a first embodiment of the disclosure.

A first embodiment will now be described with reference to FIG. 3. FIG. 3 shows a new device 301 that is to be paired with user Y's home wireless LAN 302. The user Y's home LAN 302 is provided by a wireless access point 303 that is connected via an Ethernet cable to a WAN modem, which in the example shown is a VDSL modem 304. The WAN modem 304 is connected to a cable from the local broadband access network of an ISP, that in turn connects to the core routing of the ISP 305 and thence to the Internet 306.

User Y's home WLAN 302 is one of two WLANs provided by the wireless access point 303. Home WLAN 302 is a private Wi-Fi network served by private Wi-Fi interface 307, but the access point 303 also has a public Wi-Fi interface 308. For each of these Wi-Fi interfaces 307 and 308, a router function 345 and 350 is provided. In this example, the public Wi-Fi interface 308 supports the BT-WiFi-with-FON service which is an open Wi-Fi network which members having a login name and password can access. In effect, user Y's wireless access point 303 provides a public Wi-Fi hotspot accessible to others who have a suitable login and password. The SSID for user Y's private home Wi-Fi network is "CACTU$17$", while that for the FON network is "BT-WiFi-with-FON".

User Y's neighbor, in an adjacent house, also has a wireless access point 310 that provides both a private Wi-Fi network 311 over private Wi-Fi interface 312 with a private SSID—"Orchid!", and a public Wi-Fi network over a public Wi-Fi interface 313. In this case, the public Wi-Fi network supported by the neighbor's wireless access point 310 is also BT-WiFi-with-FON, with the SSID "BT-WiFi-with-FON". Again, routing functions 355 and 360 are provided for each of the interfaces 312 and 313. In this example, the neighbor's wireless access point 310 is provided by a residential gateway device that includes a WAN modem 314 that connects directly to the local broadband access network.

The public Wi-Fi provided over the interfaces 308 and 313 connects, via routing functions 350 and 360, and modems 304 and 314 to a public Wi-Fi core network 375 by means of which access can be provided to the Internet 306. Conversely, the private WLANs 302 and 311 each connect, via their respective routing functions 345 and 355 and modems 304 and 314 to the core routing 305 provided by their respective Internet service providers (ISPs).

The new device 301 was ordered online by user Y from her ISP (or from an affiliate or agent of the ISP). As part of the ordering process, user Y identified herself to the ISP by using her email address or customer number. The ISP recorded the details provided and these are stored in a database in association with the order number. The new device 301 has unique BT-WiFi-with-FON credential configuration (a unique login name and password pair, with ideally at least a unique user name) pre-installed on it which is valid for the BT-WiFi-with-FON public SSID. These credentials (or the data needed to verify them) are also provisioned to the ISP's Wi-Fi AAA database. The ISP maintains a database "Database 1" 320 that maps the unique BT-WiFi-with-FON credentials to the serial number of the device. The warehouse shipping the new device 301 logs the identity of the device, for example in the form of the device's serial number, against the customer identity, and this pairing is provided to the ISP. The ISP then stores the association between the identity of the device and the customer identity in a database "Database 2". The ISP already has a third database "Database 3" that holds a mapping between customer identity and access point identity—for example in the form of the access point's IP address. So, in this case user Y's ISP can determine the IP address of user Y's AP from Database 3 using user Y's identity (e.g. in the form of a customer number or registered email address).

The device 301 has a Pairing Initiation Client software 321 pre-installed on it, which registers for notifications when the device 301 connects on Wi-Fi.

When user Y receives the new device 301 she plugs it in to a power supply, e.g. the mains, or otherwise powers it up. The device Wi-Fi powers up and searches for networks for which it has valid configurations (i.e. it looks for BT-WiFi-with-FON SSIDs) and selects one with which to attempt association. The Pairing Initiation Client 321 listens for connection notifications and waits till it receives notification that the device has connected to a BT-WiFi-with-FON SSID: it doesn't need to be the one provided by customer Y's access point 303. In the figure, both the customer's access point 303 and a neighbor's access point 310 effectively act as "hotspots" for BT-WiFi-with-FON, in addition to acting as access points for the respective personal wireless networks. In practice, in any residential neighborhood, even in rural areas, it is likely that a device in one household will "see" many different wireless networks, some private and some public. For ease of description and illustration, in this specification the embodiments are described and shown as existing in environments where there are two access points, each providing two wireless LANs—so that the device 301 "sees" four WLANs while seeking to pair with the private home network.

BT-WiFi-with-FON access points are "open", i.e. a device can associate to such an access point and be issued with an IP address without requiring any credentials. A "captive portal" is used to ensure that only authenticated users get access to the internet. In the captive portal, all http requests from the user's device are blocked in the BT Wi-Fi core until the user is logged in. The user's blocked requests are instead redirected to the BT Wi-Fi login web page where the user can enter her username and password. After successful authentication, the user's web traffic is forwarded (without further blocking or redirection) to the Internet.

Once the access point 303 has provided the device 301 with an IP address, the Pairing Initiation Client 321 on the device 301 makes an HTTPS request, including the stored login credentials, that is directed to the captive portal from where the request passes to the ISP's AAA server 322.

The ISP's AAA server 322 verifies the login credentials against the data held in database 1—the verification determining whether or not the device 301 is one "known" to the ISP or not.

The AAA server 322 uses the IP address of the request from the device 301 to query a database that records the IP addresses, or range of IP addresses, issued by the access points of the ISP's customers.

If the device 301 is known to the ISP, consulting database 1 reveals the device ID, which can in turn be used to consult database 2 330 to reveal the identity of the user of the device 301. Database 3 can then be used to reveal the identity of the access point associated with the "registered" user of the new device 301. So here, user Y's new device 301 leads to the identity of user's Y's access point 303 being revealed, typically in the form of an IP address.

If these mappings reveal an access point identity that matches the access point identity determined from the IP address of the request from the device, it means that the device 301 is using user Y's access point 303 rather than some other access point, such as the neighbor's access point 310. That is, user Y has connected to the public side of her own access point rather than to the public side of a neighbor's access point. In this case, the AAA server 322 sends a response to the access point 303 indicating that the AP IDs match and that access to a Local Provisioning Server 325 in the access point 303 is allowed. In addition, the access point's routing table is updated to allow access to the local provisioning server 325. The Local Provisioning Server 325 is a software application, hosted on user Y's access point, that has access to the private side SSID and Pre-Shared Key (PSK).

A provisioning server is a server which provisions configuration data to a device. They are typically used for provisioning credentials, subscriptions, etc., to devices. For example, the credentials used by the BT Wi-Fi app to log in to BT Wi-Fi are not the username and password that customers type into the app. That username and password are used to identify you as the user, but then a provisioning server creates a unique set of credentials for the specific device being used, and these credentials are then sent to the app for it to use. The local provisioning server is the one which actually has access to the credentials and can deliver them. The remote provisioning server's sole function is to be there to respond to requests from devices which do not have the correct rights to be provisioned any credentials. It will always provide a "provisioning not authorized" response. They both appear to be on the same address, and it is just a routing diversion in the access point that determines whether requests access the local or remote one. One could alternatively implement it differently so that a single local server is configured to know whether a particular device is authorized to gain access to the credentials and respond accordingly.

On successful authentication, the Pairing Initiation Client software application 321 in new device 301 initiates an HTTPS web request to the Provisioning Server 323. If the access point to which the device is connected is indeed customer Y's access point, then the web request is redirected by the access point's routing function 331 to the Local Provisioning Server 325.

The Pairing Client software application 321 and the Local Provisioning Server 325 establish a new HTTPS session.

The Pairing Client software application 321 then attempts to obtain the SSID and PSK for the private Wi-Fi interface 307 on user Y's access point 303 securely in the HTTPS session. The Pairing Client on the new device uses the newly supplied SSID and PSK, and either prioritizes the private SSID or disables the public configuration, and forces a Wi-Fi reconnect to the private SSID.

Conversely, if the AAA server 322 determines that the login request from the device 301 came from an IP address that does not correspond to those issued by the access point recorded against user Y's identity, meaning that the new device 301 has attached to an access point other than user Y's access point, the AAA server either returns a "login failure" message including a reason for the failure or gives a login success message but does not instruct the AP to divert traffic from the provisioning server 323 to the local provisioning server 325.

Figure 4:
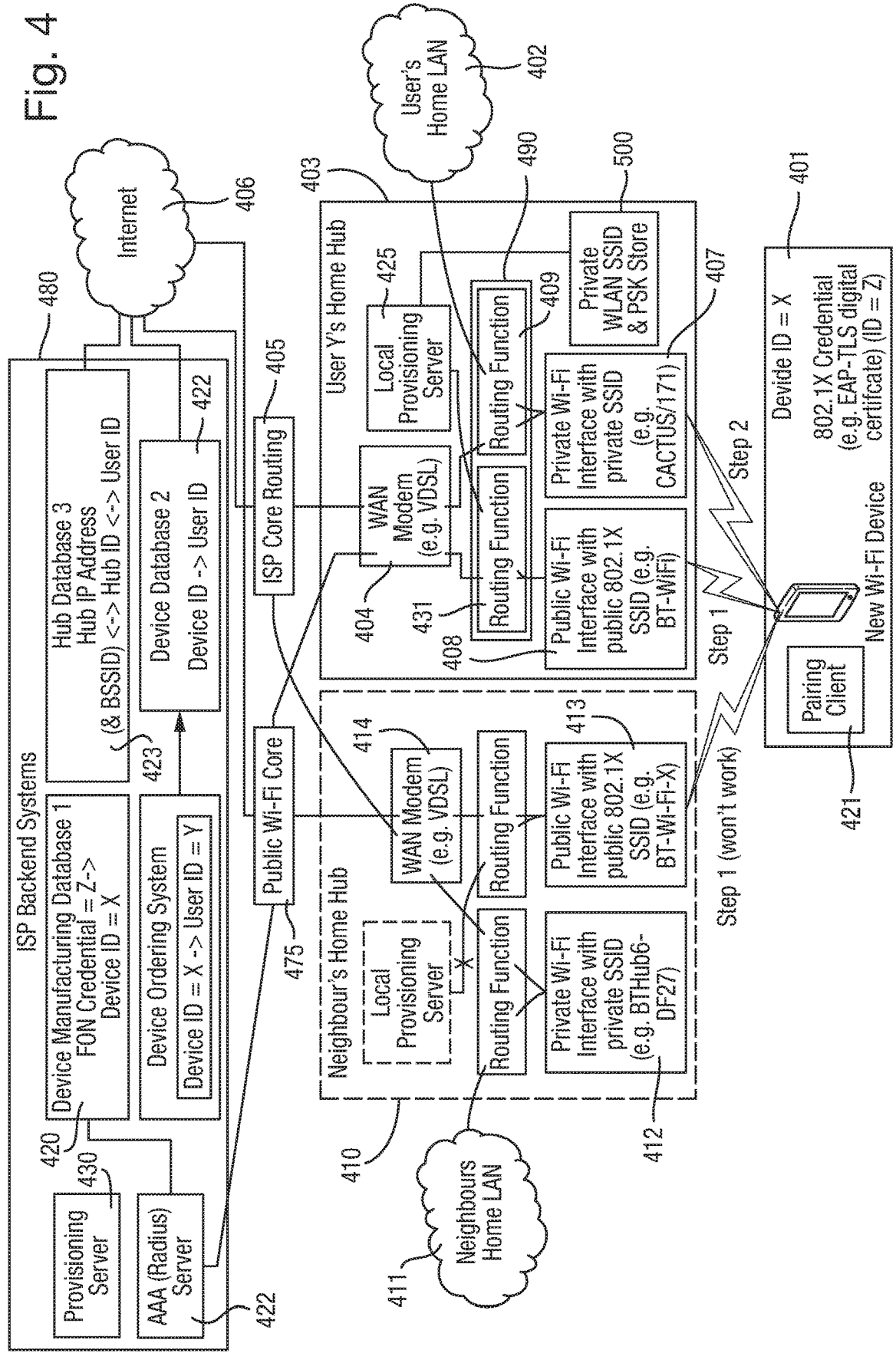
FIG. 4 is a schematic diagram showing the entities involved in an automatic pairing method according to a second embodiment of the disclosure.

A second embodiment will now be described with reference to FIG. 4. FIG. 4 shows a new device 401 in this case a tablet computer, that is to be paired with user Y's home wireless LAN 402. The user Y's home LAN 402 is provided by a wireless access point 403 which is part of a residential gateway device (for example a "BT Home Hub" version 5 or later) that includes a WAN modem 404 (e.g. a VDSL modem) that is connected to a cable from the local broadband access network of an ISP, that in turn connects to the core routing of the ISP 405 and thence to the Internet 406.

User Y's home LAN 402 is one of two LANs provided by the wireless access point 403. Home LAN 402 is a private Wi-Fi network served by private Wi-Fi interface 407. This is a secure network, which uses, for example WPA or RSN. User Y's access point 403 also has a public Wi-Fi interface 408. In this example, the public Wi-Fi interface 408 supports the BT-WiFi-X service which is a secure Wi-Fi network that uses the extensible authentication protocol, EAP, of 802.1X for authentication. In effect, user Y's wireless access point 403 provides a public Wi-Fi hotspot accessible to others who have a suitable authentication credentials. The SSID for user Y's private home Wi-Fi network is "CACTU$17$", while that for the public network is "BT-WiFi-X".

User Y's neighbor, in an adjacent house, also has a wireless access point 410 that provides both a private Wi-Fi network 411 over private Wi-Fi interface 412 with a private SSID—"Orchid!", and a public Wi-Fi network over a public Wi-Fi interface 413. In this case, the public Wi-Fi network supported by the neighbor's wireless access point 310 is also BT-WiFi-X, with the SSID "BT-WiFi-X". In this example, the neighbor's wireless access point 410 is also provided by a residential gateway device that includes a WAN modem 414 that connects directly to the local broadband access network.

As with the previous embodiment, the new device 401 was ordered online by user Y from her ISP. As part of the ordering process, user Y identified herself to the ISP by using her email address or customer number. The ISP recorded the details provided and these are stored in a database in association with the order number. The new device 401 has a unique BT-WiFi-X credential configuration pre-installed on it which is valid for the BTWifi-X public 802.1X secured SSID. These credentials (or the data needed to verify them) are also provisioned to the ISP's Wi-Fi AAA database. The ISP maintains a database "Database 1" 420 that maps the unique BT-WiFi-X credentials to the serial number of the device. The warehouse shipping the new device 401 logs the identity of the device, for example in the form of the device's serial number, against the order number and, this pairing is provided to the ISP. The ISP then stores the association between the identity of the device and the customer identity in a database "Database 2" 432. The ISP already has a third database "Database 3" 423 that holds a mapping between customer identity and access point identity—for example in the form of the access point's IP address. So, in this case user Y's ISP can determine the IP address of user Y's AP from Database 3 using user Y's identity (e.g. in the form of a customer number or registered email address). Databases 1 to 3 are all part of the ISP's backend systems 480.

The new device 401 also has a Pairing Initiation Client 421 pre-installed.

When user Y receives the new device 401 she plugs it in to a power supply, e.g. the mains, or otherwise powers it up. The device Wi-Fi powers up and searches for networks for which it has valid configurations (i.e. it looks for BTWifi-X SSIDs) and selects one with which to attempt association. The device 401 attempts to associate with the selected AP/SSID, and an 802.1X EAPoL (Extensible Authentication Protocol over LAN) exchange is initiated with an access point (in the situation shown in FIG. 4, this could be user Y's access point 403 or the neighbor's access point 410 but in the real world there might be more access points in range offering BTWiFi-X).

In the terminology of 802.1X, the new device 401 is here acting as supplicant, and the access point as authenticator. They initially negotiate the use of EAP. Thereafter, the access point sends an EAP-Request/Identity message to the device 401. The device replies with an EAP-Response/Identity message that includes an identity for the device.

The access point with which the EAPoL exchange is taking place forwards the EAP request encapsulated in a RADIUS Access-Request message to the ISP's AAA server 422—via the BT Wi-Fi AAA server if BT (i.e. the Wi-Fi service provider) is not the ISP. In other words, if the public Wi-Fi service is merely hosted by the ISP—that is, the ISP has a "roaming" deal with the Wi-Fi service provider, then the request initially goes to the Wi-Fi—provider's AAA server, which recognizes the credentials as being from a roaming partner ISP and therefore forwards them on to the ISP's AAA server for authentication there (typically over a VPN connection). The response gets returned by the same route, being proxied through the Wi-Fi service provider's (here BT's) AAA server. The Radius request includes attributes which specify the identity of the access point that sent the request (here user Y's access point 403 or the neighbor's access point 410).

When the access point 403 forwards the EAP request to the AAA server 422 the IP address of the access point could be used to convey the access point's identity. Alternatively, the "Called Station Id" AVP code 30—which is often encoded as the MAC address of the Wi-Fi access point, could be used. It could, in non-controller based Wi-Fi infrastructure, be the NAS IP Address (AVP Code 4). Indeed, for current purposes, any unique identifier would be fine.

On receiving the Access-Request message, the AAA server 422 responds with an Access-Challenge message including the EAP-Message attribute. The access point, acting as authenticator, receives the Access-Challenge message and decapsulates it before passing it on to the supplicant device 401 as an EAP-Request/Auth message. The supplicant device responds with an EAO-Response/Auth message which the access point encapsulates and sends to the AAA server as an Access-Request containing EAP-Message attributes. The ISP AAA server 422 verifies the device credentials against the data held in database 1—the verification determining whether or not the supplicant device 401 is one "known" to the ISP or not. The device credentials can be any globally unique identifier, such as the device serial number, or could be a user name and password, as used in EAP-TTLS, or could be a digital certificate (as used in EAP-TLS).

If the supplicant device is known to the AAA server, and the authentication is successful, an Access-Accept message is sent by the server to the access point. The access point decapsulates that message and forwards the EAP-Success message to the supplicant device.

If the supplicant device is known to the ISP, consulting database 1 reveals the device ID, which can in turn be used to consult database 2 to reveal the identity of the user of the supplicant device. Database 3 can then be used to reveal the identity of the access point associated with the "registered" user of the supplicant device. So here, user Y's new device 401 leads to the identity of user's Y's access point 403 being revealed, typically in the form of an IP address. If these mappings reveal an access point identity that matches the access point identity included in the RADIUS request it means that the supplicant device 401 is using user Y's access point 403 rather than some other access point, such as the neighbor's access point 410. That is, user Y has connected to the public side of her own access point rather than to the public side of a neighbor's access point. In this case, the AAA server 422 adds a vendor specific element to the RADIUS response indicating that the AP IDs match and that access to a Local Provisioning Server 425 in the access point 403 is allowed. In addition, the access point's routing table 431 is updated to allow access to the local provisioning server 425. The Local Provisioning Server 425 is a software application, hosted on user Y's access point, that has access to the private side SSID and Pre-Shared Key (PSK).

If the access point IDs do not match, it means that the supplicant device has attached to an access point other than that associated with the user. In this case, the AAA server can add notes in a vendor specific attribute pair to the effect that the access point IDs do not match and that access to the "Local Provisioning Service" is disallowed. An alternative way of dealing with this situation is provided by a third embodiment that is detailed below.

Alternatively, if the access point IDs do match, the AAA server can just send an EAP-SUCCESS message, followed by a change of authorization, COA, either to end the session or to enable access to the Local Provisioning Server.

The Local Provisioning Server 425 is a software application, hosted on user Y's access point, that has access to the private side SSID and the Pre-Shared Key (PSK).

On successful authentication, the Pairing Initiation Client software application 421 in new device 401 initiates a web request to the Provisioning Server 430. If the access point to which the device is connected is indeed customer Y's access point, then the web request is redirected by the access point's routing function 431 to the Local Provisioning Server 425. The Local Provisioning Server 425 responds by supplying the SSID and PSK for the private Wi-Fi interface 407 on user Y's access point 403. The Pairing Client on the new device uses the newly supplied SSID and PSK, and either prioritizes the private SSID or disables the public 802.1X configuration, and forces a Wi-Fi reconnect to the private SSID.

If the access point is not customer Y's access point, and if the new device 401 has not been disconnected by the alternative COA mechanism, then the request passes straight through to the network based Provisioning Server 430 which responds by indicating that the new device 401 is connected to the wrong access point. Advantageously, in this embodiment, the network based Provisioning Server, 430, also provides the BSSID of the public side of the correct access point. For this unsuccessful case, where the new device is connected to the public side of someone's access point other than user Y's, the "Pairing Client" disconnects the Wi-Fi from the current access point—and attempts to prioritize the BSSID of the public side of the customer's own AP if supplied by the network based Provisioning Server, it then repeats the relevant steps of the process set out above for each matching AP until it succeeds or has attempted all visible matching APs (where SSID=BTWifi-X).

Figure 5:
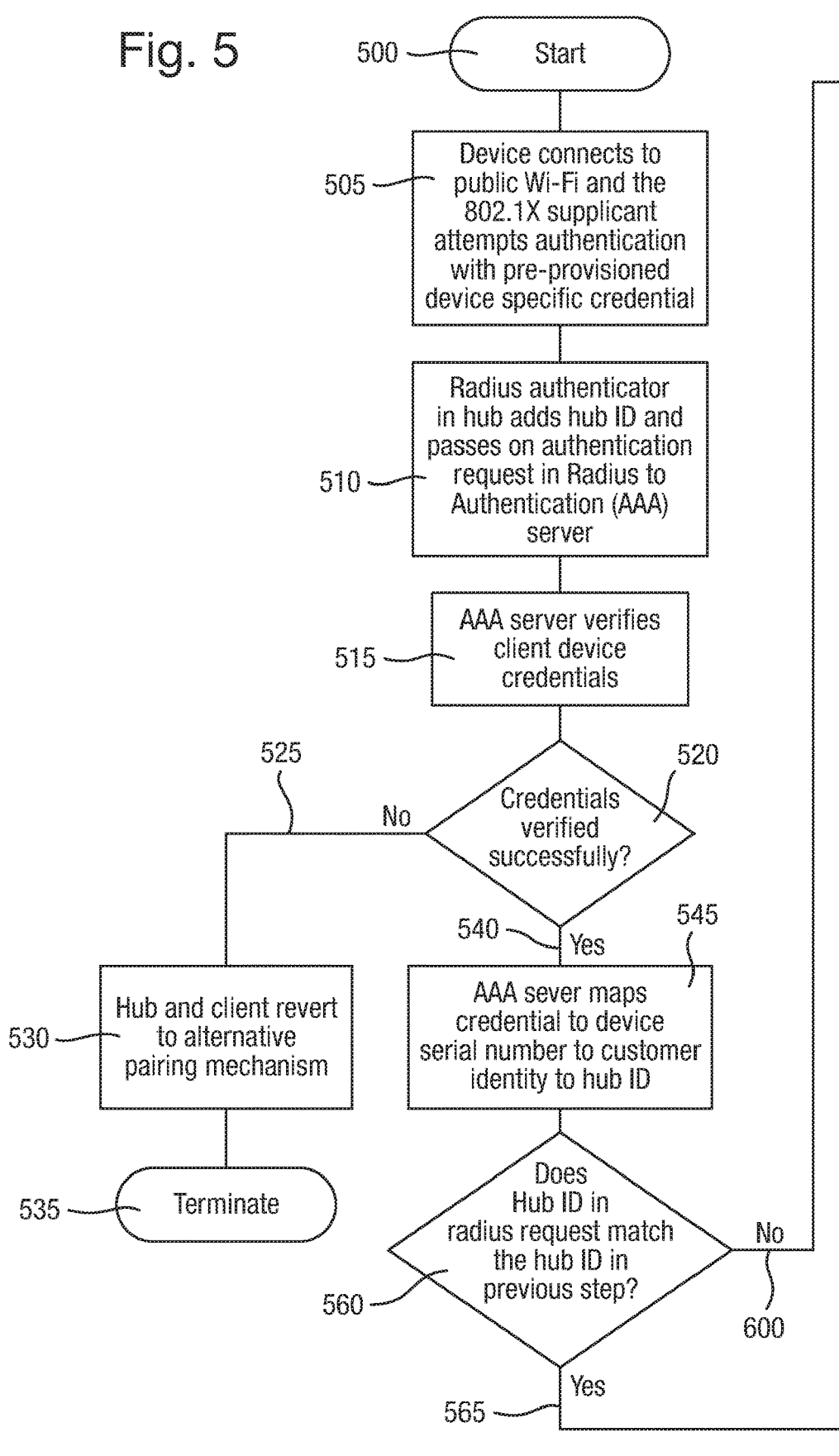
FIG. 5 is a flow chart representing the operation of a method according to the second embodiment of the disclosure.
Figure 5:
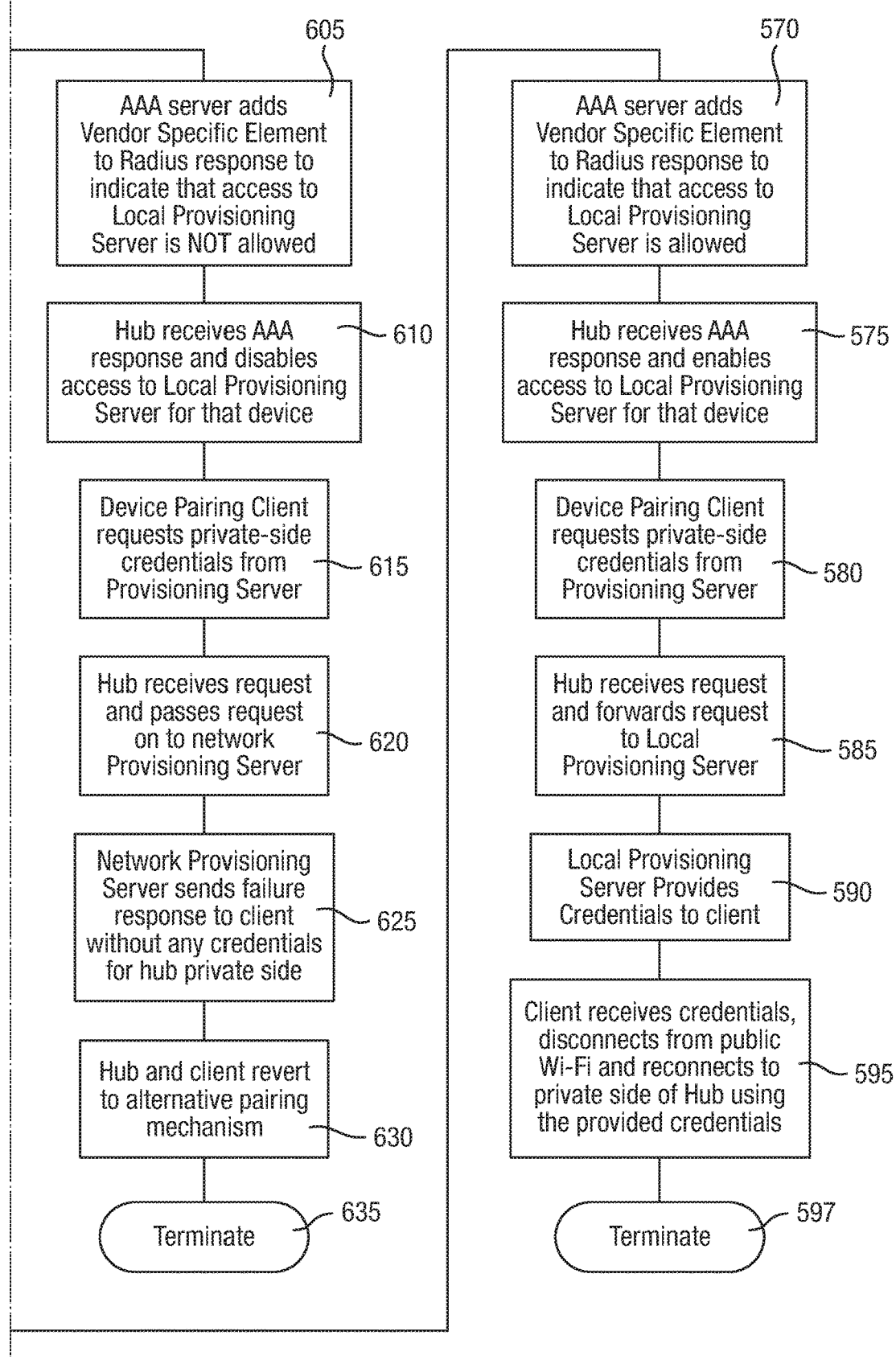
Figure 6:
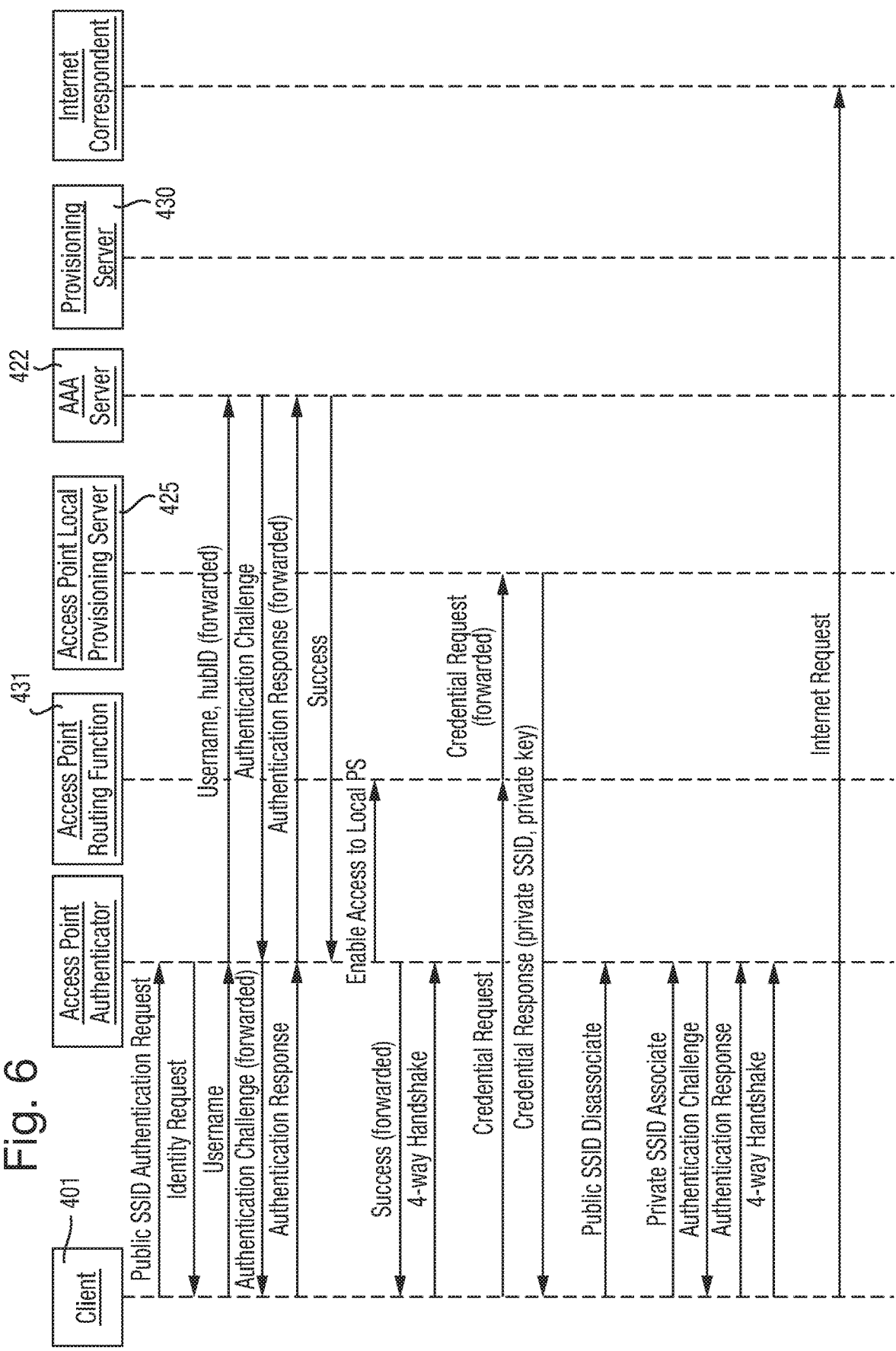
FIG. 6 is a messaging diagram showing the sequence of messages exchanged between various entities that together provide the automatic pairing method according to the second embodiment of the disclosure.
Figure 7:
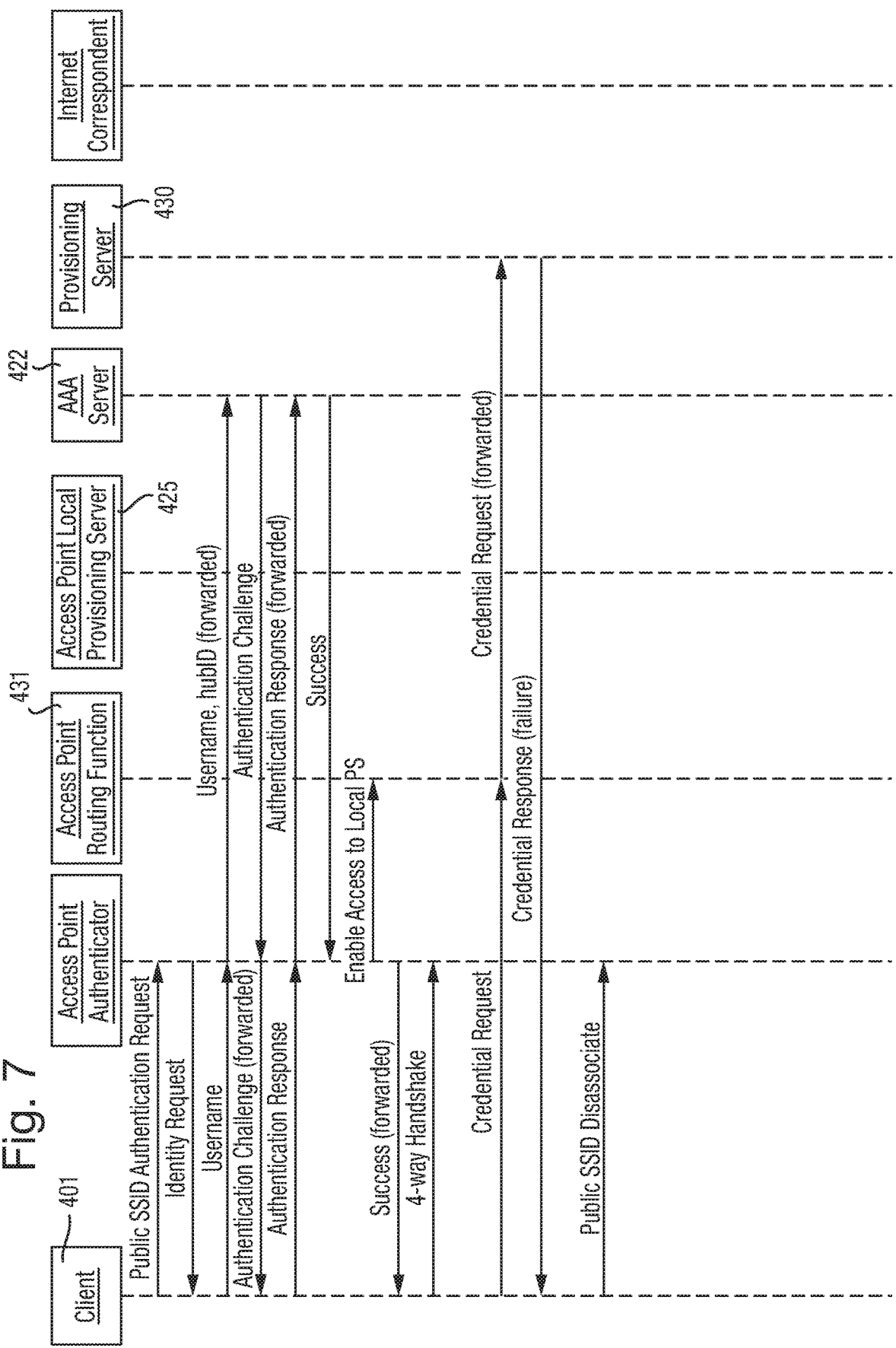
FIG. 7 is an alternative messaging diagram to that of FIG. 6, showing the sequence of messages exchanged between the various entities under other conditions.

A method according to the second embodiment is also illustrated by the flow chart of FIG. 5, and the accompanying timing diagrams, FIG. 6 for the successful case, and FIG. 7 for the unsuccessful case. The method begins, in 500, with the powering up of the device 401. In 505 the device 401 connects to the public Wi-Fi and the 802.1X supplicant in the device attempts to authenticate using the pre-provisioned device-specific credentials. At 510, the authenticator function in the access point 403 adds the access point's ID to the authentication request that is forwarded, as a RADIUS request, to the Authentication (AAA) Server 422.

At 515, the AAA server 422 verifies the client device 401's credentials. If the credentials cannot satisfactorily be verified 525 the access point 403 and the device 401 revert to an alternative pairing mechanism and the process terminates.

If the credentials can be verified, at 545 the AAA server maps these credentials to the device serial number, thence to the customer ID and thence to the access point ID/IP address, using the first to third databases 420, 422, 423. A check is then made to determine whether the access point ID just retrieved from the database matches the access point ID received in the RADIUS request, at 560. If they do match, at 570, the AAA server 422 adds a Vendor Specific element to a RADIUS "success" response to indicate to the access point that access to the local provisioning server 425 is permitted.

At 575 the access point receives the AAA "success" response enabling access to the local provisioning client. The access point also forwards the success message to the device 401.

At 580, following receipt of the success message, the pairing client 421 in the device 401 requests credentials for the private Wi-Fi from the provisioning server 422. At 585 the access point receives the request for credentials and forwards it to the local provisioning server 425. At 590 the local provisioning server provides the credentials to the client.

At 595 the pairing client in the device 401 receives the credentials, disconnects from the public Wi-Fi and reconnects to the private Wi-Fi interface using the credentials provided.

In the event that the access point ID retrieved from the database in 545 does not match the access point ID received in the RADIUS request 600 meaning that the device has connected to the public Wi-Fi provided by an access point other than the user's access point 401 access to the local provisioning server 425 is not allowed. This is shown in FIG. 7, as well as in the sequence from 605 to 635.

At 605 the AAA server adds a Vendor Specific Element to the RADIUS response to indicate that access to the Local Provisioning Server is not allowed. This Failure response is received by the access point 403, and access to the local provisioning serve is disabled for the device 401. The pairing client 421 in the device 401 requests private side credentials from the provisioning server 430. The access point receives this request from the device and passes it to the provisioning server 430 in the network. The provisioning server sends, at 625, a failure response to the client without any credentials for the private side. At 630 the access point and device revert to an alternative pairing mechanism.

Note that the neighbor's access point does not need to have any special functionality, such as a Local Provisioning Server, but if it does have a Local Provisioning Server, no redirect will happen and access to the local server will still be blocked, on the basis of the content of the AAA response.

Third Embodiment

In order to explain the working of the third embodiment, it is necessary to look at the access point and some network entities and functions in greater detail.

Figure 8:
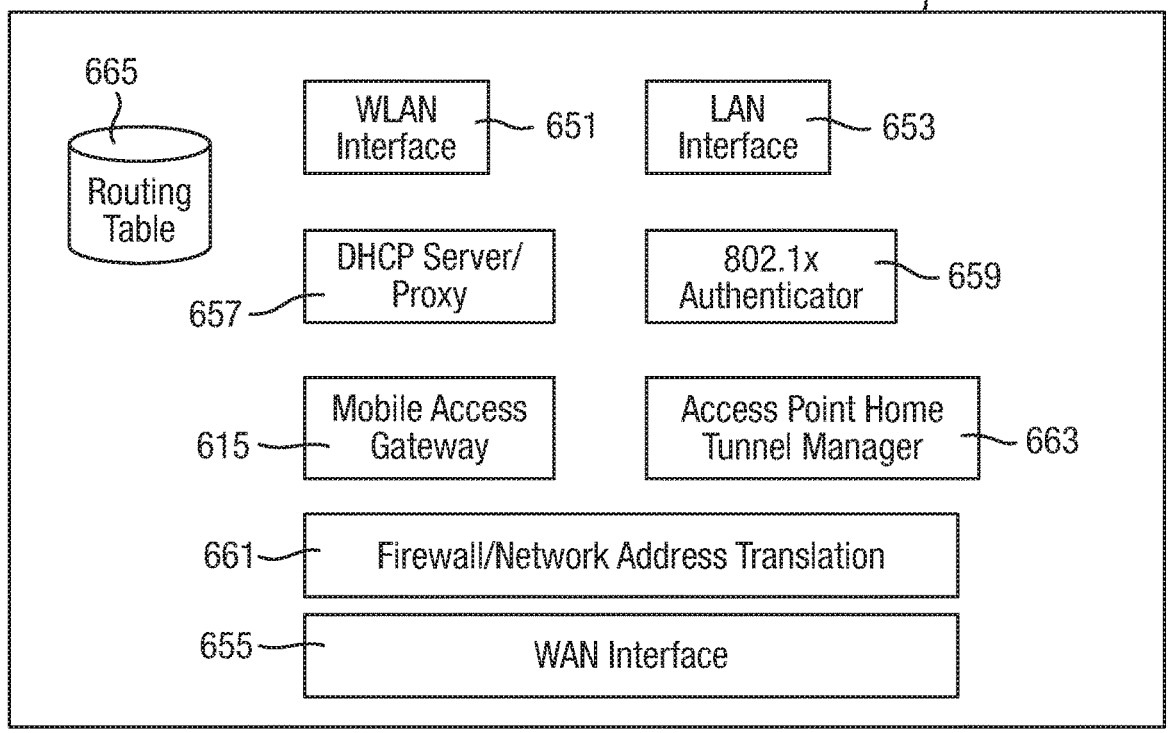
FIG. 8 is a schematic diagram showing the functional components of the home access point router illustrated in FIG. 1.

FIG. 8 schematically shows the functional components of a home access point router 403 in the second embodiment. To communicate with a range of other network entities, the home access point router 403 contains a Wireless Local Area Network (WLAN) interface 651, a Local Area Network (LAN) interface 653 and a Wide Area Network (WAN) interface 655. In this embodiment, the WLAN interface 651 operates in accordance with the 802.11n wireless protocol, the LAN interface 653 operates in accordance with the Ethernet protocol and the WAN interface 655 operates in accordance with a Digital Subscriber Line (DSL, e.g. VDSL) protocol.

The home access point router 403 operates the WLAN interface 651 and the LAN interface 653 to communicate with the local devices, such as 421, and the WAN interface 655 is enabled for communication with the Internet 406 via the ISP access network. The home access point router 403 also contains a DHCP server or proxy unit 657, an 802.1X authenticator 659, a firewall or network address translation (NAT) module 661, a Mobility Access Gateway 615, an Access Point Home Tunnel manager 663 and a routing table 665, that is used by the access point routing function 490, for use by the network interfaces 651, 653, 655 in directing the flow of packets between the local and external facing interfaces of the home access point router 403 towards their intended destinations.

As is conventional, the firewall 661 is responsible for monitoring the contents of packets transferred across the WAN interface 655 and rejecting those which should not be allowed onto the WLAN/LAN. The NAT module 661 is further responsible for changing the source address of packets received from the WLAN/LAN interface 651, 653 towards the WAN interface 655, and changing the destination address of packets received from the WAN interface 655 towards the WLAN/LAN interface 651, 653 so that the local addresses of devices such as 421 on the LAN side are not exposed to the other sections of the network, such as the ISP access network or the Internet 406.

The DHCP server 657 is used for allocating local IP addresses whilst the 802.1X authenticator 659 is used for authentication of any devices connected on the WLAN interface 655. The Mobile Access Gateway 615 implements part of a PMIP system. It adjusts the routing table entries in the routing table 665 of the home agent router 17 which govern how data traffic is handled by the home access point router 403.

The Access Point Home tunnel manager 663 is responsible for creating data tunnels to a network home tunnel manager 583 located in a home agent router 17 and managing them, for example by combining the traffic from two different mobile nodes into a single tunnel instead of creating two separate tunnels to the same destination. The functionality of the access point home tunnel manager 663 also includes destroying tunnels when they are no longer needed. The operation of the access point home tunnel manager 663 will be described in more detail later.

To make explanation simpler, we can consider the ISP core and the public Wi-Fi core to be essentially one and the same. Alternatively, all traffic from the ISP customers gets tunneled through to the ISP core once login has happened (and thus the customer has been identified as belonging to that ISP).

Figure 9:
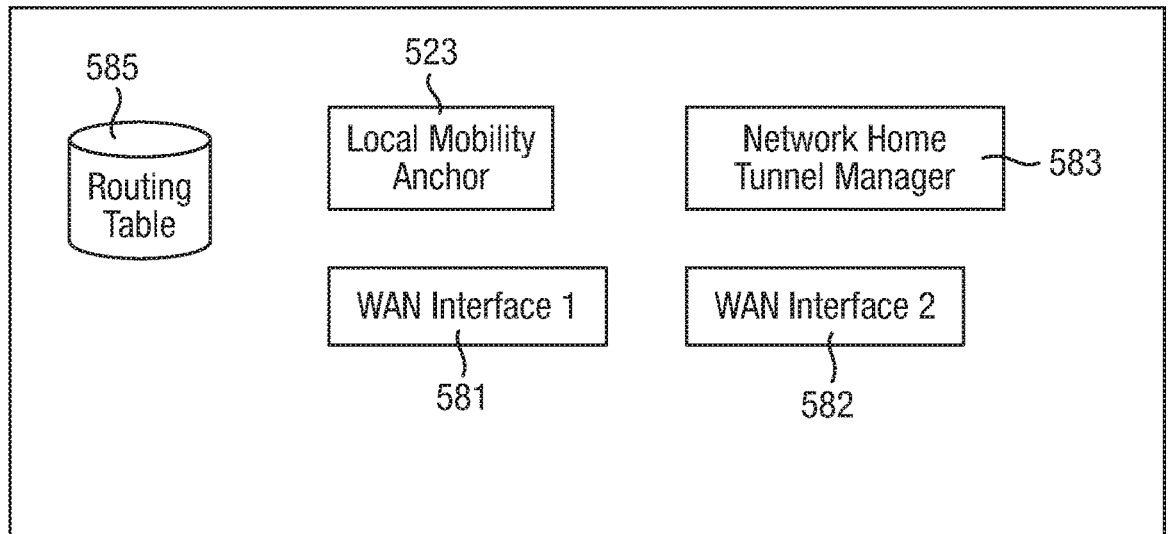
FIG. 9 is a schematic diagram showing the functional components of a home agent router which is part of the core network.

FIG. 9 shows a schematic view of the functional components of a home agent router 17 located in the ISP core routing 405 as shown in FIG. 4. The home agent router 17 contains a WAN interface 581, in this case operating to a DSL protocol, e.g. VDSL, for communicating with devices on the local access network such as the home access point routers 403 and 410, and other devices located on the Internet 406 such as Internet correspondent nodes. The home agent router 17 also includes a local mobility anchor 523, for managing the various mobile devices connected on the access network, and a network home tunnel manager 583 for communicating with the access point home tunnel manager 663 of the home access point router 403. A routing table 585 stores the routing information necessary to redirect received data packets to the intended recipients (such as mobile nodes and correspondent nodes).

The operation of this embodiment will be described in a series of steps.

Step 1

Device 401 connects to the public Wi-Fi side (408 or 413) of an access point (e.g. 403 or 410) using BT Wi-Fi of some kind, following authentication, for example as described above using the AAA server in the core network. Once connected, all traffic is tunneled, using a "first tunnel", through to the BT Wi-Fi core 405 or 475. A network routing function in the BT Wi-Fi core maintains a mapping between the IP address of the device and the tunnel identifier of the tunnel to the public side Wi-Fi of the access point (home hub) 403 or 410.

Step 2

When the customer has successfully authenticated, the AAA server 422 sends an instruction to a network home tunnel manager 583 in the ISP core 405 containing the customer ID, and IP address of his/her device 401 to set up a home tunnel for that customer. The network home tunnel manager 583 looks up a database that links the customer ID with the ID of his/her access point (e.g. their home Hub ID) 403 and its corresponding IP address. The network home tunnel manager 583 then initiates the creation of a new tunnel, the "second tunnel", from the core network to their access point (e.g. BT Home Hub) 403.

Step 3

The network home tunnel manager 583 then sends an instruction to the network routing function, which is part of ISP core routing 405, the instruction containing the IP address of the customer's device and the identity of the second tunnel created in step 2, to update the routing of traffic to and from the device 401.

Step 4

The network routing function adjusts its routing table 585 to take traffic arriving from that customer's device 401 via the first tunnel from BT Wi-Fi (e.g. as identified by their IP address) and sets a rule that any traffic addressed to the provisioning server 430 (e.g. as identified by its IP address) is forwarded down the second tunnel to the access point 403 (e.g. their home Hub). It sets up a similar rule for the reverse path, routing any traffic that is received from the access point 403 via the second tunnel and that is addressed to the device 401 down the first tunnel.

Step 5

On the access point 403, the access point home tunnel manager 663 receives the home tunnel initiation request from the network home tunnel manager 583 and sets up its end of the second tunnel. It also sends an instruction to the access point routing function 490 (containing the tunnel identifier, device IP address and provisioning server address) to update the access point routing table 665 which sets up a routing rule to route traffic addressed to the provisioning server 430 to the local provisioning server 425 on the access point 403. Similarly, it sets up a rule for the reverse path, routing any traffic from the local provisioning server 425 (and/or to the device 401) down the second tunnel to the ISP core.

A range of variants is possible here, for example, the reverse path could be set up only when inbound traffic is received from the second tunnel, where the address of the correspondent is noted and all outbound traffic to that correspondent is routed down the tunnel.

Step 6

Now that the tunnels and routing tables have been configured, when the device 401 sets up an HTTPS session to the provisioning server 430 the traffic gets routed to the local provisioning server 425 on the user's own access point 403, even though the device has connected to the public Wi-Fi on the neighbor's access point 410. This means that the device 401 can retrieve credentials needed for access to the user's private WLAN 402 securely through the tunnels, without the need for direct local communication between the device and the user's own access point.

Whilst reference has been made separately to a "first tunnel" and a "second tunnel", a skilled person will appreciate that these two tunnels can be considered to constitute a single tunnel.

Comparing the three preceding embodiments, it should be noted that there are a number of different issues when one connects to a Wi-Fi network:

1/ Creating a connection to the access point to allow layer 2 communication with the AP 2/ Obtaining an IP address 3/ Identifying yourself to the network so that it knows it should forward your traffic to the internet (rather than discarding it)

4/ Securing the communications.

With 802.1X (e.g. BTWifi-X), all four steps are completed before the connection is considered to be established on the device. (No applications will gain access to the connection before all 4 are complete). (Step 3 actually happens before step 2.)

With captive portal based public Wi-Fi (e.g. BTOpen-zone, BT-Wifi-with-FON), only steps 1 and 2 are competed before the connection is presented for use by applications on the device. There is then a period when applications think they have a connection, but all traffic (other than login attempts) is discarded in the core. After the login has been completed (using HTTPS) then traffic can flow to and from the internet. All this traffic will be in the clear over the air, so if applications want to secure it, they have to use application layer security like HTTPS or alternatively some form of VPN solution such as an IPSec VPN. In the first embodiment, which uses an open SSID, HTTPS is used to secure the communications with the provisioning server.

An electronic device according to an embodiment of the disclosure may include a smartphone, a tablet computer, a mobile phone, a video telephone, an electronic book reader, a desktop computer, a Wi-Fi repeater, a laptop computer, a netbook computer, a server, a personal digital assistant, a portable multimedia player, an MP3 player, a mobile medical device, a camera, or a wearable device.

An electronic device according to an embodiment of the disclosure may also be a home appliance, such as a television, a media streaming device, a video projector, a DVD player, a PVR, an audio device, a refrigerator, a thermostat, a heating controller, a heater, a central heating boiler, an air conditioner, an oven, a microwave oven, a washing machine, a coffee machine, weighing scales, a set-top box, a game console, or a TV box (e.g. Apple TV®, or Google TV®), or a security device—such as a security camera or fire alarm, or a utility meter such as a water meter, electricity meter, or gas meters, etc. An electronic device according to an embodiment of the disclosure may also be an exercise device, or a medical device (e.g., a portable medical measurement device, such as a blood glucose monitoring device, a heartbeat measuring device, a blood pressure measuring device, a body temperature measuring device, etc.). Any of the preceding devices could be an Internet of Things device.

The invention claimed is:

1. A method for the automatic pairing of a device wirelessly with a first secure wireless local area network (WLAN) provided by a pairing access point using a first set of security credentials, the method comprising:

establishing automatically a connection between the device and a second WLAN provided by an available access point, and authenticating the device with the second WLAN using a second set of security credentials stored on the device;

identifying the pairing access point using the second set of security credentials;

creating a tunnel between the device and the pairing access point over the second WLAN;

making a request from the device, via the tunnel, to a provisioning server on the pairing access point for transfer of the second set of security credentials, being the security credentials needed to pair with the first secure WLAN, from the pairing access point to the device; and using the second set of security credentials to configure the security settings for the first secure WLAN in the device.

2. The method as claimed in claim 1, wherein creating the tunnel between the device and the pairing access point involves determining an IP address of the pairing access point based on the second set of security credentials.

3. The method as claimed in claim 1, wherein the request from the device is addressed to a network-based provisioning server and the method further comprises, after creating the tunnel, modifying routing instructions in a network routing function so that the request from the device is forwarded down the tunnel to the pairing access point.

4. The method as claimed in claim 1, further comprising using the configured security settings to pair the device with the first secure WLAN provided by the pairing access point.

5. The method as claimed in claim 1, the method further comprising attempting connection with the first secure WLAN using the configured security settings to pair the device with the first secure WLAN provided by the pairing access point, and in the event that the attempt at connection fails, removing the configured security credentials from the device.

6. The method as claimed in claim 1, wherein the pairing access point and available access point are connected to a core network, and creating the tunnel comprises:

creating a tunnel between the core network and the pairing access point; and establishing routing functions to enable traffic to pass between the device on the available access point and the provisioning server on the pairing access point using the tunnel.

\* \* \* \* \*

UNITED STATES PATENT AND TRADEMARK OFFICE
CERTIFICATE OF CORRECTION

Page 1 of 3

PATENT NO. : 11,418,959 B2
APPLICATION NO. : 16/475293
DATED : August 16, 2022
INVENTOR(S) : Simon Ringland It is certified that error appears in the above-identified patent and that said Letters Patent is hereby corrected as shown below:

On the Title Page

Below the Abstract, in figure, for step "545", Line 1, delete "sever" and insert -- server --, therefor.

Below the Abstract, in figure, for step "630", Line 1, delete "client" and insert -- device --, therefor.

In the Drawings

Sheet 3 of 9, FIG. 3, Tag "310", Line 1, delete "Neighbour's" and insert -- Neighbor's --, therefor.

Sheet 3 of 9, FIG. 3, Tag "311", Line 1, delete "Neighbours" and insert -- Neighbor's --, therefor.

Sheet 3 of 9, FIG. 3, Tag "312", Lines 4-5, delete "(e.g.)" and insert -- (e.g. Orchid!) --, therefor.

Sheet 3 of 9, FIG. 3, Tag "307", Line 5, delete "CACTUS/175)" and insert -- CACTU$17$) --, therefor.

Sheet 4 of 9, FIG. 4, "  " and insert

-- 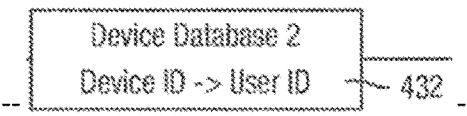 --, therefor.

Sheet 4 of 9, FIG. 4, Tag "410", Line 1, delete "Neighbour's" and insert -- Neighbor's --, therefor.

Sheet 4 of 9, FIG. 4, Tag "411", Line 1, delete "Neighbours" and insert -- Neighbor's --, therefor.
Sheet 4 of 9, FIG. 4, Tag "413", Line 5, delete "BT-Wi-Fi-X)" and insert -- BT-WiFi-X) --, therefor.

Signed and Sealed this
Fourth Day of April, 2023

Katherine Kelly Vidal
*Director of the United States Patent and Trademark Office*

Sheet 4 of 9, FIG. 4, Tag "408", Line 5, delete "BT-WiFi)" and insert -- BT-WiFi-X) --, therefor.

Sheet 4 of 9, FIG. 4, Tag "407", Line 5, delete "CACTUS/171)" and insert -- CACTU$17$) --, therefor.

Sheet 4 of 9, FIG. 4, delete Tag "500".

Sheet 4 of 9, FIG. 4, Tag "401", Line 1, delete "Devide" and insert -- Device --, therefor.

Sheet 4 of 9, FIG. 4, Tag "401", Line 4, delete "certifcate)" and insert -- certificate) --, therefor.

Sheet 5 of 9, FIG. 5, for step "545", Line 1, delete "sever" and insert -- server --, therefor.

Sheet 6 of 9, FIG. 5, for step "630", Line 1, delete "client" and insert -- device --, therefor.

Sheet 9 of 9, FIG. 8, Tag "659", Line 1, delete "802.1x" and insert -- 802.1X --, therefor.

In the Specification

In Column 1, Line 36, delete "very significantly" and insert -- very significant --, therefor.

In Column 2, Line 42, delete "user if" and insert -- user is --, therefor.

In Column 4, Line 44, delete "room thermostat 80" and insert -- room thermostat 50 --, therefor.

In Column 4, Line 46, delete "kitchen 200." and insert -- kitchen 20. --, therefor.

In Column 5, Line 46, delete "credentials then" and insert -- credentials that --, therefor.

In Column 6, Line 53, delete "connects on" and insert -- connects to --, therefor.

In Column 6, Lines 54-55, delete "plugs it in to" and insert -- plugs it into --, therefor.

In Column 7, Line 39, delete "user's Y's" and insert -- user Y's --, therefor.

In Column 7, Lines 60-61, delete "log in to" and insert -- log into --, therefor.

In Column 8, Lines 25-26, delete "Wi-Fi reconnect" and insert -- Wi-Fi to reconnect --, therefor.

In Column 9, Lines 33-34, delete "plugs it in to" and insert -- plugs it into --, therefor.

In Column 10, Line 25, delete "EAP-TTLS," and insert -- EAP-TLS, --, therefor.

In Column 10, Line 39, delete "user's Y's" and insert -- user Y's --, therefor.
In Column 10, Line 51, delete "table 431" and insert -- function 431 --, therefor.

CERTIFICATE OF CORRECTION (continued)

In Column 11, Line 15, delete "Wi-Fi reconnect" and insert -- Wi-Fi to reconnect --, therefor.

In Column 11, Line 23, delete "Server, 430," and insert -- Server 430, --, therefor.

In Column 11, Lines 45-46, delete "client device 401's" and insert -- client device's 401 --, therefor.

In Column 11, Line 53, delete "databases 420, 422, 423." and insert -- databases 420, 432, 423. --, therefor.

In Column 11, Line 62, delete "client." and insert -- server. --, therefor.

In Column 11, Line 67, delete "provisioning server 422." and insert -- provisioning server 425. --, therefor.

In Column 12, Line 13, delete "user's access point 401" and insert -- user's access point 403 --, therefor.

In Column 12, Line 20, delete "serve" and insert -- server --, therefor.

In Column 12, Line 58, delete "Mobility" and insert -- Mobile --, therefor.

In Column 13, Line 11, delete "connected on" and insert -- connected to --, therefor.

In Column 13, Lines 11-12, delete "WLAN interface 655." and insert -- WLAN interface 651. --, therefor.

In Column 13, Lines 41-42, delete "connected on" and insert -- connected to --, therefor.

In Column 14, Line 1, delete "ISP core 405" and insert -- ISP core routing 405 --, therefor.

In Column 15, Line 22, delete "competed" and insert -- completed --, therefor.